United States Patent
Zhang et al.

(10) Patent No.: US 11,022,438 B2
(45) Date of Patent: Jun. 1, 2021

(54) DISTANCE MEASURING DEVICE, DISTANCE MEASURING SYSTEM AND DISTANCE MEASURING METHOD

(71) Applicant: BOE TECHNOLOGY GROUP CO., LTD., Beijing (CN)

(72) Inventors: Yifei Zhang, Beijing (CN); Tailiang Li, Beijing (CN); Ying Zhang, Beijing (CN); Kai Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 275 days.

(21) Appl. No.: 16/203,718

(22) Filed: Nov. 29, 2018

(65) Prior Publication Data

US 2019/0331490 A1 Oct. 31, 2019

(30) Foreign Application Priority Data

Apr. 28, 2018 (CN) .......................... 201810401663.2

(51) Int. Cl.
| | |
|---|---|
| *G01C 15/02* | (2006.01) |
| *G01C 3/06* | (2006.01) |
| *G06F 3/01* | (2006.01) |
| *B25J 9/00* | (2006.01) |

(52) U.S. Cl.
CPC ............... *G01C 15/02* (2013.01); *G01C 3/06* (2013.01); *G06F 3/014* (2013.01); *B25J 9/0006* (2013.01)

(58) Field of Classification Search
CPC ....................................................... G06F 3/014
See application file for complete search history.

(56) References Cited

U.S. PATENT DOCUMENTS

2010/0234182 A1* 9/2010 Hoffman ................. G06F 3/014
482/8
2018/0081439 A1* 3/2018 Daniels ................... G06F 3/015

FOREIGN PATENT DOCUMENTS

WO WO-2014068509 A2 * 5/2014 ............ B25J 9/0006

* cited by examiner

*Primary Examiner* — Eric S. McCall
*Assistant Examiner* — Timothy P Graves
(74) *Attorney, Agent, or Firm* — Brooks Kushman P.C.

(57) ABSTRACT

The present disclosure provides a distance measuring device, a distance measuring system and a distance measuring method. The distance measuring device includes a finger sleeve assembly and a communication component. The finger sleeve assembly includes a first interphalangeal joint and a second interphalangeal joint that is rotatable connected to the first interphalangeal joint. The communication component is disposed on the finger sleeve assembly and is configured to transmit and/or receive a ranging signal.

19 Claims, 5 Drawing Sheets

DISTANCE MEASURING DEVICE, DISTANCE MEASURING SYSTEM AND DISTANCE MEASURING METHOD

CROSS-REFERENCE TO RELATED APPLICATION

This application claims priority to Chinese Application No. 201810401663.2, filed on Apr. 28, 2018, which is incorporated herein by reference in its entirety.

TECHNICAL FIELD

The present disclosure relates to the field of measurement and control technologies, and in particular to a distance measuring device, a distance measuring system and a distance measuring method.

BACKGROUND

With development of the science and technology, people's requirements for measuring methods are getting higher and higher. Currently, simple measurement is mainly carried out by a tape measure. The tape measure often requires at least two people to work together to make measurements. Further, the tape measure and other distance measuring device have poor portability.

SUMMARY

One embodiment of the present disclosure provides a distance measuring device. The distance measuring device includes a finger sleeve assembly and a communication component. The finger sleeve assembly includes a first interphalangeal joint and a second interphalangeal joint that is rotatable connected to the first interphalangeal joint. The communication component is disposed on the finger sleeve assembly and is configured to transmit and/or receive a ranging signal.

In one embodiment, the distance measuring device further includes a calculation circuit configured to determine a distance to be measured according to the ranging signal.

In one embodiment, the communication component is disposed at the second interphalangeal joint; and the distance measuring device further includes a gyroscope and an adjustment-control circuit; the gyroscope is disposed at the second interphalangeal joint and is configured to obtain a first attitude angle of the communication component; the communication component is further configured to send the first attitude angle to an opposite communication component and/or receive a second attitude angle transmitted by the opposite communication component; and the adjustment-control circuit is configured to control rotation of the first interphalangeal joint and/or the second interphalangeal joint according to the first attitude angle and the received second attitude angle, thereby adjusting and controlling an angle at which the communication component transmits and/or receives the ranging signal.

In one embodiment, the finger sleeve assembly further includes a metacarpophalangeal joint; the metacarpophalangeal joint is configured to fix the distance measuring device; the metacarpophalangeal joint is rotatable connected to the first interphalangeal joint; and the first interphalangeal joint is pivotally connected between the metacarpophalangeal joint and the second interphalangeal joint.

In one embodiment, the finger sleeve assembly further includes: a first driving mechanism disposed between the metacarpophalangeal joint and the first interphalangeal joint, and configured to drive the first interphalangeal joint to rotate with respect to the metacarpophalangeal joint according to the control signal sent from the adjustment-control circuit; and a second driving mechanism disposed between the first interphalangeal joint and the second interphalangeal joint and configured to drive the second interphalangeal joint to rotate with respect to the first interphalangeal joint according to the control signal sent from the adjustment-control circuit.

In one embodiment, the first interphalangeal joint is provided with a first bracket; the first driving mechanism includes a first motor and a first reducer mounted to the first motor; and the first motor and the first reducer are fixed to the metacarpophalangeal joint; wherein the first reducer is provided with a first keyway; the first keyway engages with the first bracket; and the first motor is configured to drive the first bracket to rotate.

In one embodiment, the first interphalangeal joint is provided with a second bracket, and the second interphalangeal joint is provided with a third bracket; the second driving mechanism includes a second motor and a second reducer mounted to the second motor; the second motor and the second reducer are fixed to the second bracket; wherein the second reducer is provided with a second keyway; the second keyway engages with the third bracket; and the second motor is configured to drive the third bracket to rotate.

In one embodiment, the communication component includes an infrared transceiver.

In one embodiment, the distance measuring device further includes a monitor disposed at the second interphalangeal joint.

In one embodiment, the distance measuring device further includes a prompter disposed at the second interphalangeal joint.

In one embodiment, the prompter includes an indicator lamp.

In one embodiment, the distance measuring device further includes a battery in the second interphalangeal joint.

One embodiment of the present disclosure provides a distance measuring system that includes a first distance measuring device, a second measuring device and a calculation circuit. The first distance measuring device includes a first finger sleeve assembly and a first communication component; the first finger sleeve assembly includes a first interphalangeal joint and a second interphalangeal joint that is rotatable connected to the first interphalangeal joint; the first communication component is disposed at the first finger sleeve assembly and is configured to transmit a ranging signal. The second distance measuring device includes a second finger sleeve assembly and a second communication component; the second finger sleeve assembly includes a third interphalangeal joint and a fourth interphalangeal joint that is rotatable connected to the third interphalangeal joint; the second communication component is disposed at the second finger sleeve assembly and is configured to receive the ranging signal. The calculation circuit is configured to, according to the ranging signal, determine a distance between the first distance measuring device and the second distance measuring device.

In one embodiment, the distance measuring system further includes a monitor; the monitor is coupled with the calculation circuit and is configured to display the distance between the first distance measuring device and the second distance measuring device.

In one embodiment, the distance measuring system further includes a unit conversion circuit; the unit conversion circuit is coupled with the calculation circuit and the monitor; and the unit conversion circuit is configured to convert the unit of the distance between the first distance measuring device and the second distance measuring device, and send a distance of a converted unit to the monitor to be displayed.

In one embodiment, the first communication component is disposed at the second interphalangeal joint, the second communication component is disposed at the fourth interphalangeal joint, a first gyroscope is disposed at the second interphalangeal joint and a second gyroscope is disposed at the fourth interphalangeal joint; the distance measuring system further includes an adjustment-control circuit; the first gyroscope is configured to obtain a first attitude angle of the first communication component; the second gyroscope is configured to obtain a second attitude angle of the second communication component; the first communication component is further configured to transmit the first attitude angle to the adjustment-control circuit; the second communication component is further configured to transmit the second attitude angle to the adjustment-control circuit; the adjustment-control circuit is configured to, according to the first attitude angle and the second attitude angle, control at least one of the first interphalangeal joint and the second interphalangeal joint as well as at least one of the third interphalangeal joint and the fourth interphalangeal joint to rotate, thereby enabling the second communication component to receive the ranging signal.

In one embodiment, the adjustment-control circuit is configured to, according to a difference between the first attitude angle and the second attitude angle, control at least one of the first interphalangeal joint and the second interphalangeal joint as well as at least one of the third interphalangeal joint and the fourth interphalangeal joint to rotate, thereby enabling the second communication component to receive the ranging signal.

In one embodiment, the distance measuring system further includes a prompter coupled with the adjustment-control circuit; the adjustment-control circuit is further configured to send a measurement signal to the prompter when the first attitude angle and the second attitude angle satisfy a preset condition and the second communication component receives the ranging signal; the prompter is configured to send a measurement prompt according to the measurement signal sent from the adjustment-control circuit.

One embodiment of the present disclosure further provides a distance measuring method applied to the above distance measuring system. The distance measuring method includes: sending, by the first distance measuring device, a ranging signal; receiving, by the second distance measuring device, the ranging signal sent from the first distance measuring device; determining, by the calculation circuit, a distance between the first distance measuring device and the second distance measuring device according to the ranging signal.

In one embodiment, the first communication component is disposed at the second interphalangeal joint, the second communication component is disposed at the fourth interphalangeal joint, a first gyroscope is disposed at the second interphalangeal joint and a second gyroscope is disposed at the fourth interphalangeal joint, and the distance measuring system further includes an adjustment-control circuit. Before receiving, by the second distance measuring device, the ranging signal sent from the first distance measuring device, the distance measuring method further includes: obtaining, by the first gyroscope, a first attitude angle of the first communication component; obtaining, by the second gyroscope, a second attitude angle of the second communication component; sending, by the first communication component, the first attitude angle to the adjustment-control circuit; sending, by the second communication component, the second attitude angle to the adjustment-control circuit; and based on the first attitude angle and the second attitude angle, controlling, by the adjustment-control circuit, at least one of the first interphalangeal joint and the second interphalangeal joint as well as at least one of the third interphalangeal joint and the fourth interphalangeal joint to rotate, thereby enabling the second communication component to receive the ranging signal.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Figure 1:
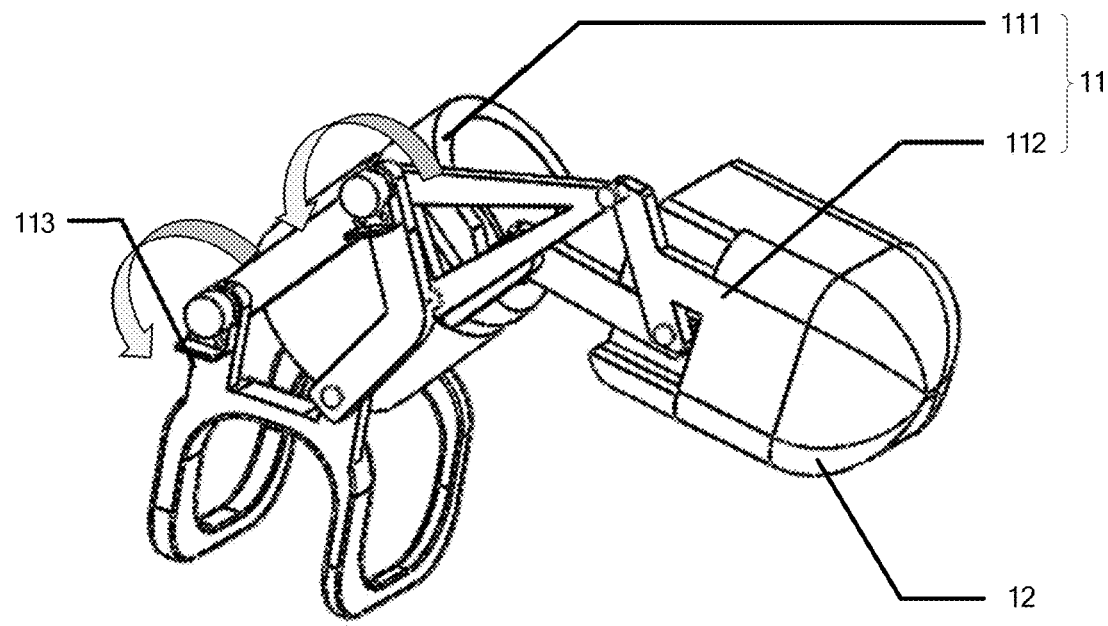
FIG. 1 is a schematic view of a distance measuring device viewing from a first perspective according to an embodiment of the present disclosure.
Figure 2:
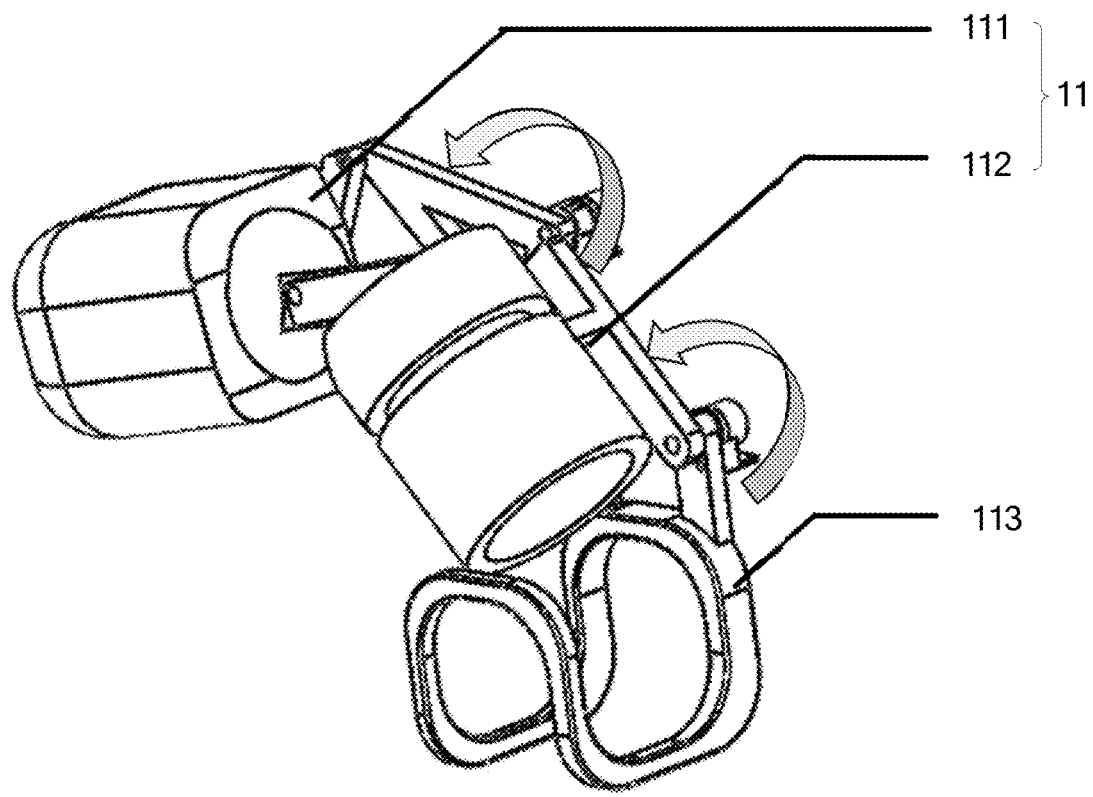
FIG. 2 is a schematic view of the distance measuring device viewing from a second perspective according to an embodiment of the present disclosure.

One embodiment of the present disclosure provides a distance measuring device. As shown in FIG. 1 and FIG. 2, the distance measuring device may include a finger sleeve assembly 11 and a communication component 12. The finger sleeve assembly 11 includes a first interphalangeal joint 111 and a second interphalangeal joint 112 that is rotatable connected to the first interphalangeal joint 111. The communication component 12 is disposed on the finger sleeve assembly 11 and is configured to transmit and/or receive ranging signals. The communication component 12 may be disposed on the first interphalangeal joint 111 or the second interphalangeal joint 112 (as shown in FIG. 1), or disposed on other positions of the finger sleeve assembly 11.

Specifically, the finger sleeve assembly 11 may be sleeved on a user's finger, thereby improving portability of the distance measuring device. The second interphalangeal joint 112 is rotatable connected to the first interphalangeal joint 111, then, the first interphalangeal joint 111 and the second interphalangeal joint 112 can be rotated as the user's finger bends, thereby improving the user's comfort when the user wears the distance measuring device. Further, when the communication component 12 is disposed on the first interphalangeal joint 111 or the second interphalangeal joint 112, rotation of the first interphalangeal joint 111 with respect to the second interphalangeal joint 112 can adjust an angle of the communication component 12, thereby improving flexibility of the distance measuring device.

Figure 3:
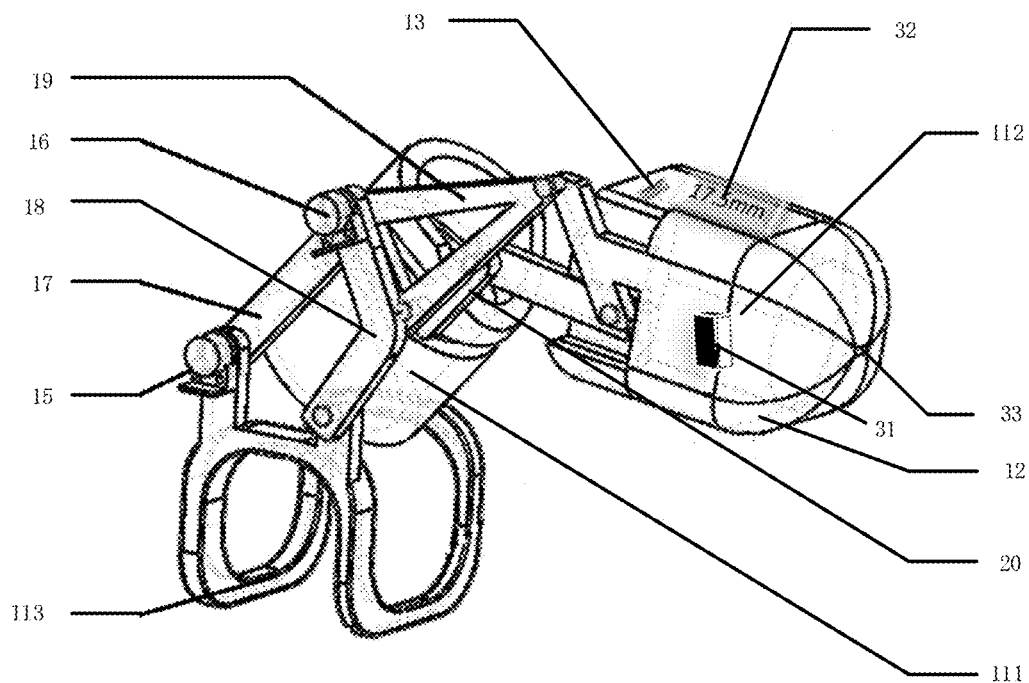
FIG. 3 is a schematic view showing connections among joints of the distance measuring device according to an embodiment of the present disclosure.
Figure 4:
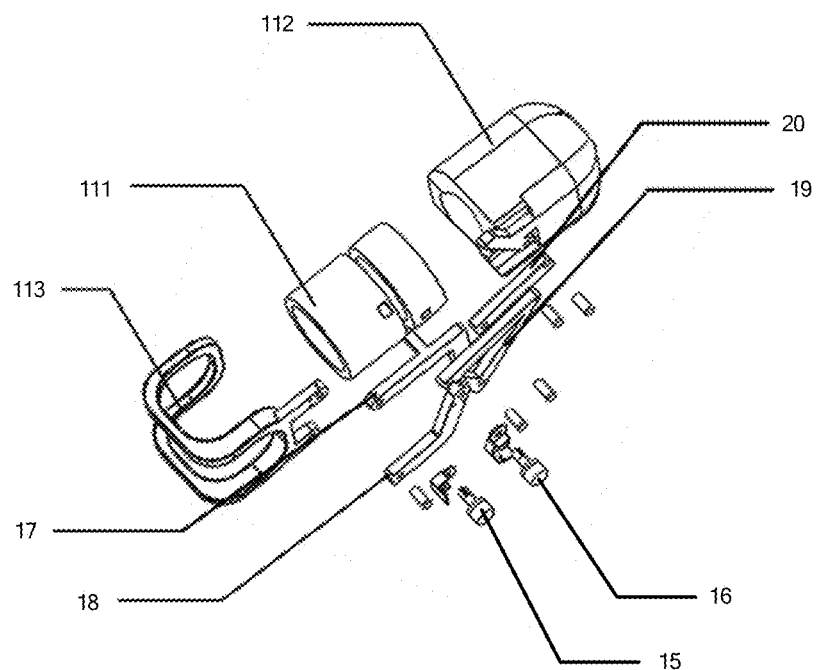
FIG. 4 is an exploded view of the distance measuring device according to an embodiment of the present disclosure.

As shown in FIG. 3 and FIG. 4, the second interphalangeal joint 112 may be rotatable connected to the first interphalangeal joint 111 in a variety of forms. For example, the rotary connection between the first interphalangeal joint 111 and the second interphalangeal joint 112 may be realized by a hinge connection between a first bracket 17 disposed on the first interphalangeal joint 111 and a fourth bracket 20 disposed on the second interphalangeal joint 112. The fourth bracket 20 may also be hinged to the second interphalangeal joint 112. The connection between the first interphalangeal joint 111 and the second interphalangeal joint 112 is not limited to the above manner, and any connection manner that can realize the rotary connection between the first interphalangeal joint 111 and the second interphalangeal joint 112 falls within the protection scope of the present disclosure.

In actual application, when measuring a distance between two points, two sets of the above distance measuring devices may be adopted. For example, the two sets of distance measuring devices may be called as a local distance measuring device and an opposite distance measuring device, respectively. The communication component of the local distance measuring device transmits a ranging signal, and the communication component of the opposite distance measuring device receives the ranging signal. Then, a distance between the two sets of distance measuring devices can be determined according to the ranging signal. A detailed introduction to the above implementation may refer to description of the subsequent embodiments. When the distance measuring device is used to measure a distance between the distance measuring device and an object that can reflect the ranging signal, the communication component of the distance measuring device can transmit ranging signals while receiving the ranging signals.

The ranging signal that is transmitted and/or received by the communication component 12 may be an infrared signal. In some embodiments, the communication component 12 for transmitting the ranging signal may include an infrared emitter, and the communication component 12 for receiving the ranging signal may include an infrared receiver. In one embodiment of the present disclosure, the communication component 12 for transmitting and receiving the ranging signal may include an infrared transceiver 61.

With the distance measuring device of one embodiment of the present disclosure, it is easy to measure distances with fingers. The rotary connection between the first interphalangeal joint and the second interphalangeal joint improves flexibility of the distance measuring device as well as the user's comfort when the user wears the distance measuring device.

In actual application, the above distance measuring device may further include a calculation circuit configured to determine a distance to be measured according to the ranging signal. The ranging signal may include information such as a transmission time point, a reception time point, and a propagation speed of the ranging signal. The calculation circuit may further include a reading circuit that reads transmission and reception of the ranging signal through a single chip computer and obtains a value of the distance through calculation.

In order to realize automatic measurement, the above distance measuring device may further include an adjustment-control component. The adjustment-control component is disposed on the finger sleeve assembly 11. The adjustment-control component is configured to obtain an attitude angle of the communication component 12 and control rotation of the first interphalangeal joint 111 and/or the second interphalangeal joint 112, thereby adjusting an angle at which the communication component 12 transmits and/or receives the ranging signal.

Figure 7:
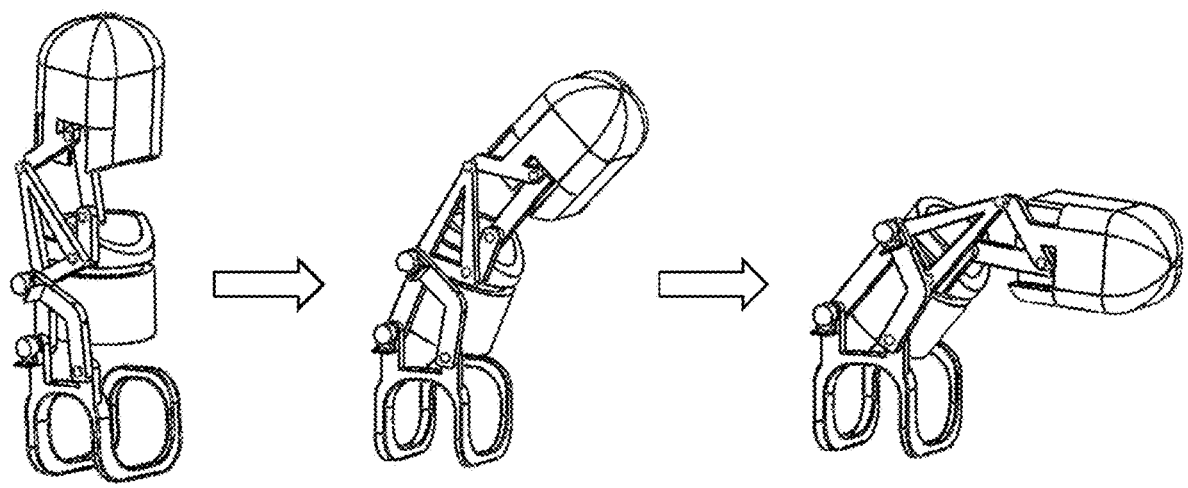
FIG. 7 is a schematic view showing three different rotation states of a first interphalangeal joint and a second interphalangeal joint of the distance measuring device according to an embodiment of the present disclosure.

Specifically, as shown in FIG. 3, the above communication component 12 may be disposed on the second interphalangeal joint 112. The above adjustment-control component may include a gyroscope 13 and an adjustment-control circuit. The gyroscope 13 may be disposed at the second interphalangeal joint 112 and is configured to obtain a first attitude angle of the communication component 12. The communication component 12 is further configured to send the first attitude angle to the opposite communication component and/or receive a second attitude angle transmitted by the opposite communication component. The adjustment-control circuit is configured to control rotation of the first interphalangeal joint 111 and/or the second interphalangeal joint 112 according to the first attitude angle and the received second attitude angle of the opposite communication component, thereby adjusting and controlling the angle at which the communication component 12 transmits and/or receives the ranging signal. Referring to FIG. 7, FIG. 7 shows three different rotation states of the first interphalangeal joint and the second interphalangeal joint under control of the adjustment-control circuit.

The gyroscope 13 may be an MEMS gyroscope. The first attitude angle includes horizontal and vertical parameters of the communication component 12. After a test is completed, the gyroscope 13 transmits the first attitude angle to the communication component 12. The communication component 12 may communicate with the opposite communication component through 2.4 Ghz (e.g., transmission mode) or in a Bluetooth mode. When the local distance measuring device includes the adjustment-control circuit and the opposite distance measuring device includes the adjustment-control circuit, the communication component 12 needs to transmit the first attitude angle to the opposite distance measuring device while receiving the second attitude angle transmitted by the opposite distance measuring device.

Specifically, the adjustment-control circuit may make a difference between the first attitude angle and the second attitude angle. When the difference is not zero, i.e., the communication component for transmitting the ranging signal is not parallel to the communication component for receiving the ranging signal, the adjustment-control circuit sends a control signal to control at least one of the first interphalangeal joint 111 and the second interphalangeal joint 112 to continue rotating until the difference between the first attitude angle and the second attitude angle is zero. When the difference between the first attitude angle and the second attitude angle is zero, it means that the communication component for transmitting the ranging signal is parallel to the communication component for receiving the ranging signal. Then, the adjustment-control circuit no longer controls the first interphalangeal joint 111 and/or the second interphalangeal joint 112 to continue rotating and ensures that the communication component for receiving the ranging signal can receive the ranging signal. The communication component for receiving the ranging signal may be the local communication component or the opposite communication component. The above functions of the adjustment-control circuit may be realized by a single chip computer.

In order to further improve application flexibility of the distance measuring device, referring to FIG. 1 and FIG. 2, the above finger sleeve assembly 11 may further include a metacarpophalangeal joint 113. The metacarpophalangeal joint 113 is configured to fix the distance measuring device. The metacarpophalangeal joint 113 is rotatable connected to the first interphalangeal joint 111. The first interphalangeal joint 111 is pivotally connected between the metacarpophalangeal joint 113 and the second interphalangeal joint 112.

The metacarpophalangeal joint 113 may be made of soft material, and then may be flexibly deformed and clamp the distance measuring device. In this way, even in extreme environments in which it is not appropriate for users to wear the distance measuring device, the distance measuring device may be clamped tightly by the metacarpophalangeal joint 113 and then may be used to measure a distance.

The rotary connection between the metacarpophalangeal joint 113 and the first interphalangeal joint 111 may be realized by a hinge connection between the metacarpophalangeal joint 113 and the first bracket 17 disposed on the first interphalangeal joint 111, as shown in FIG. 3 and FIG. 4. The connection between the metacarpophalangeal joint 113 and the first interphalangeal joint 111 is not limited to the above manner, and any connection manner that can realize the rotary connection between the first interphalangeal joint 111 and the metacarpophalangeal joint 113 falls within the protection scope of the present disclosure.

The first interphalangeal joint 111 is pivotally connected with each of the metacarpophalangeal joint 113 and the second interphalangeal joint 112, then an angle of the communication component 12 may be adjusted in two degrees of freedom, thereby further improving the flexibility of the distance measuring device.

In actual application, the finger sleeve assembly 11 may further include a first driving mechanism 15 and a second driving mechanism 16. The first driving mechanism 15 is disposed between the metacarpophalangeal joint 113 and the first interphalangeal joint 111. The first driving mechanism 15 is configured to, according to the control signal sent from the adjustment-control circuit, drive the first interphalangeal joint 111 to rotate with respect to the metacarpophalangeal joint 113. The second driving mechanism 16 is disposed between the first interphalangeal joint 111 and the second interphalangeal joint 112. The second driving mechanism 16 is configured to, according to the control signal sent from the adjustment-control circuit, drive the second interphalangeal joint 112 to rotate with respect to the first interphalangeal joint 111. Under action of the first driving mechanism 15 and the second driving mechanism 16, the finger sleeve assembly 11 can realize automatic bending function.

Figure 5:
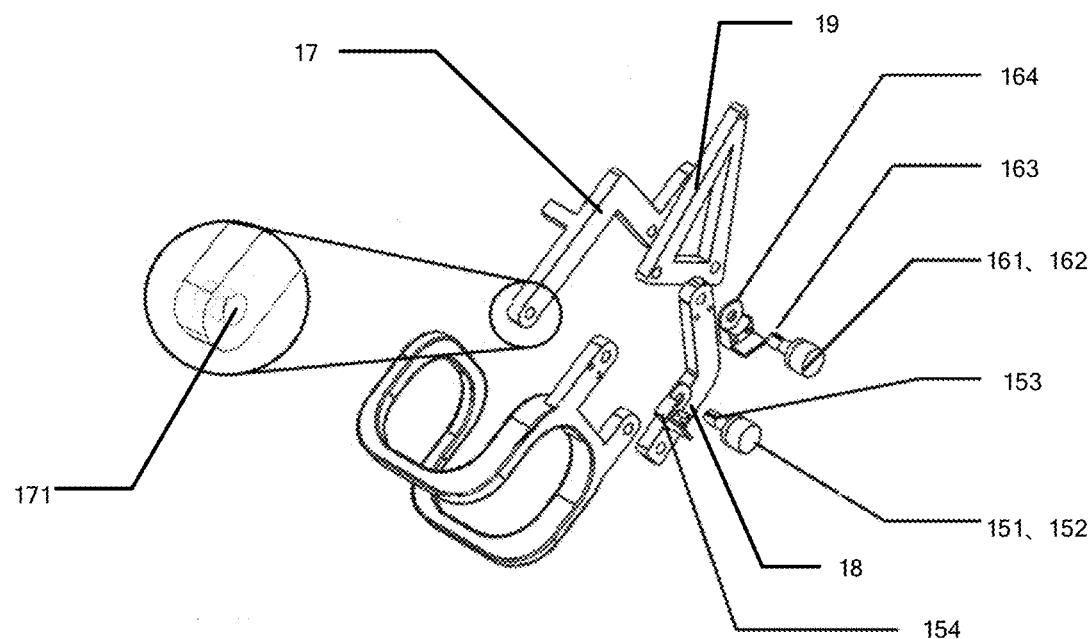
FIG. 5 is a schematic view showing assembling of a driving mechanism of the distance measuring device according to an embodiment of the present disclosure.

Specifically, as shown in FIG. 3 to FIG. 5, the first interphalangeal joint 111 is connected with the first bracket 17. The first driving mechanism 15 includes a first motor 151 and a first reducer 152 mounted to the first motor 151. The first motor 151 and the first reducer 152 are fixed to the metacarpophalangeal joint 113. The first reducer 152 is provided with a first keyway 153. The first keyway 153 engages with the first bracket 17. The first motor 151 is configured to drive the first bracket 17 to rotate, thereby driving the first interphalangeal joint 111 to rotate with respect to the metacarpophalangeal joint 113. The first driving mechanism 15 may further include a first mounting bracket 154. The first motor 151 and the first reducer 152 are fixed to the metacarpophalangeal joint 113 through the first mounting bracket 154. The first keyway 153 of the first reducer 152 is fitted in a hole 171 of the first bracket 17 with an interference fit. The first bracket 17 is mounted to a slot of the first interphalangeal joint 111.

The first interphalangeal joint 111 is connected with a second bracket 18, and the second interphalangeal joint 112 is connected with a third bracket 19. The second driving mechanism 16 includes a second motor 161 and a second reducer 162 mounted to the second motor 161. The second motor 161 and the second reducer 162 are fixed to the second bracket 18. The second reducer 162 is provided with a second keyway 163. The second keyway 163 engages with the third bracket 19. The second motor 161 is configured to drive the third bracket 19 to rotate, thereby driving the second interphalangeal joint 112 to rotate with respect to the first interphalangeal joint 111. The second driving mechanism 16 may further include a second mounting bracket 164. The second motor 161 and the second reducer 162 are fixed to the second bracket 18 through the second mounting bracket 164. The second bracket 18 is hinged to the second interphalangeal joint 112. Three holes in the third bracket 19 may be connected with the second bracket 18, the first bracket 17 and the second interphalangeal joint 112, respectively. The connection between each of the three holes in the third bracket 19 and each of the second bracket 18, the first bracket 17 and the second interphalangeal joint 112 may be a hinge connection.

One embodiment of the present disclosure further provides a distance measuring system. The distance measuring system includes a first distance measuring device, a second measuring device and a calculation circuit. The first distance measuring device includes a first finger sleeve assembly and a first communication component. The first finger sleeve assembly includes a first interphalangeal joint and a second interphalangeal joint that is rotatable connected to the first interphalangeal joint. The first communication component is disposed on the first finger sleeve assembly and is configured to transmit ranging signals. The second distance measuring device includes a second finger sleeve assembly and a second communication component. The second finger sleeve assembly includes a third interphalangeal joint and a fourth interphalangeal joint that is rotatable connected to the third interphalangeal joint. The second communication component is disposed on the second finger sleeve assembly and is configured to receive the ranging signals. The calculation circuit is configured to, according to the ranging signal, determine a distance between the first distance measuring device and the second distance measuring device. In actual application, the calculation circuit may be disposed at the first distance measuring device, the second distance measuring device or other components of the distance measuring system. The position of the calculation circuit is not specifically limited. Each of the first distance measuring device and the second distance measuring device may have the same structure as that of the above distance measuring device.

Both of the first finger sleeve assembly and the second finger sleeve assembly may be sleeved on the user's fingers, thereby improving portability of the distance measuring system.

The first interphalangeal joint and the second interphalangeal joint can be rotated as the user's finger bends, and the third first interphalangeal joint and the fourth interphalangeal joint can be rotated as the user's finger bends, thereby further improving the user's comfort when the user wears the distance measuring system. Further, angles of the first communication component and the second communication component can be adjusted according to actual situation, thereby improving flexibility of the distance measuring system.

Figure 6:
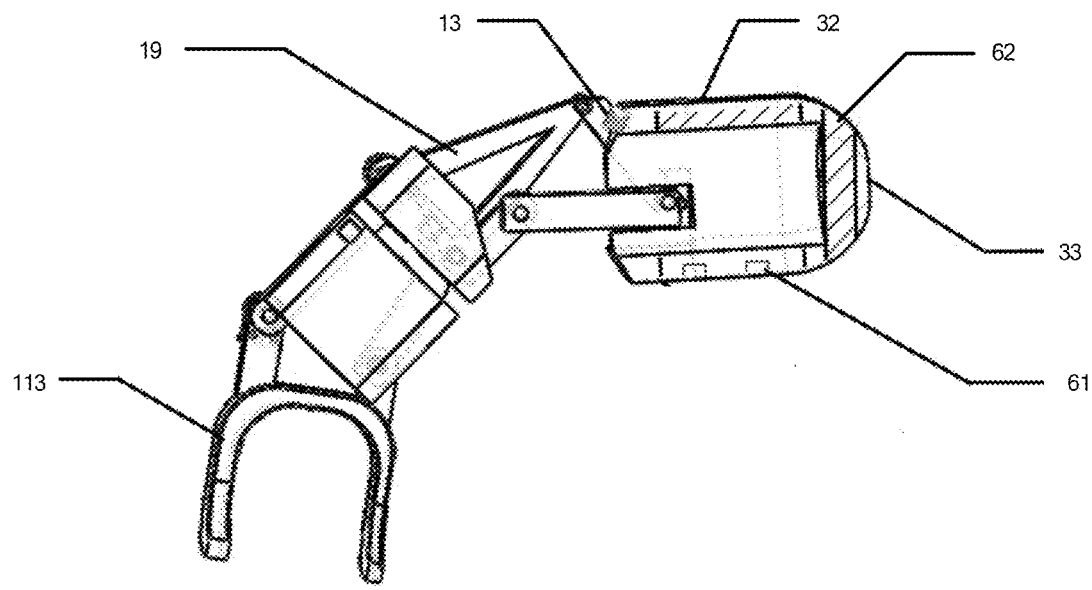
FIG. 6 is a cross-sectional view of the distance measuring device according to an embodiment of the present disclosure.

In actual application, referring to FIG. 3 and FIG. 6, the above distance measuring system may further include a monitor 32. The monitor 32 is coupled with the calculation circuit, and is configured to display the distance between the first distance measuring device and the second distance measuring device. Specifically, the monitor 32 may be a LCD display screen or an OLED display screen disposed at the first distance measuring device or the second distance measuring device. Further, in one embodiment, the distance measuring system may further include a unit conversion circuit 31. The unit conversion circuit 31 is coupled with the calculation circuit and the monitor 32. The conversion circuit 31 is configured to convert the unit of the distance between the first distance measuring device and the second distance measuring device, and send a distance of a converted unit to the monitor 32 to be displayed. Specifically, the unit conversion circuit 31 may realize changes of a reading unit of the single chip computer through conversion of high and low levels.

In order to realize automatic measurement, the first communication component is disposed at the second interphalangeal joint, the second communication component is disposed at the fourth interphalangeal joint, a first gyroscope may be disposed at the second interphalangeal joint and a second gyroscope may be disposed at the fourth interphalangeal joint. Meanwhile, the distance measuring system may further include an adjustment-control circuit. The first gyroscope is configured to obtain a first attitude angle of the first communication component. The second gyroscope is configured to obtain a second attitude angle of the second communication component. The first communication component is further configured to transmit the first attitude angle to the adjustment-control circuit. The second communication component is further configured to transmit the second attitude angle to the adjustment-control circuit. The adjustment-control circuit is configured to, according to the first attitude angle and the second attitude angle, control at least one of the first interphalangeal joint and the second interphalangeal joint as well as at least one of the third interphalangeal joint and the fourth interphalangeal joint to rotate, thereby enabling the second communication component to receive the ranging signal.

The adjustment-control circuit may be disposed at the first distance measuring device, the second distance measuring device or disposed at each of the first distance measuring device and the second distance measuring device. The adjustment-control circuit may also be provided separately from the first distance measuring device and the second distance measuring device, as long as the adjustment-control circuit can control at least one of the first interphalangeal joint, the second interphalangeal joint, the third interphalangeal joint and the fourth interphalangeal joint to rotate according to the first attitude angle and the second attitude angle, thereby enabling the second communication component to receive the ranging signal. The position of the adjustment-control circuit is not specifically limited.

Figure 8:
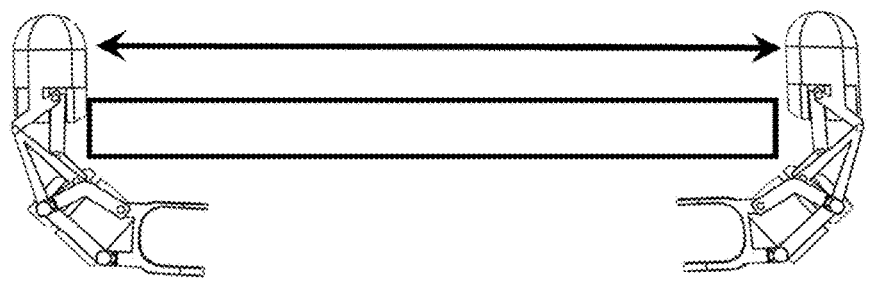
FIG. 8 is a schematic view of a distance measuring system in a first application scenario according to an embodiment of the present disclosure.
Figure 9:
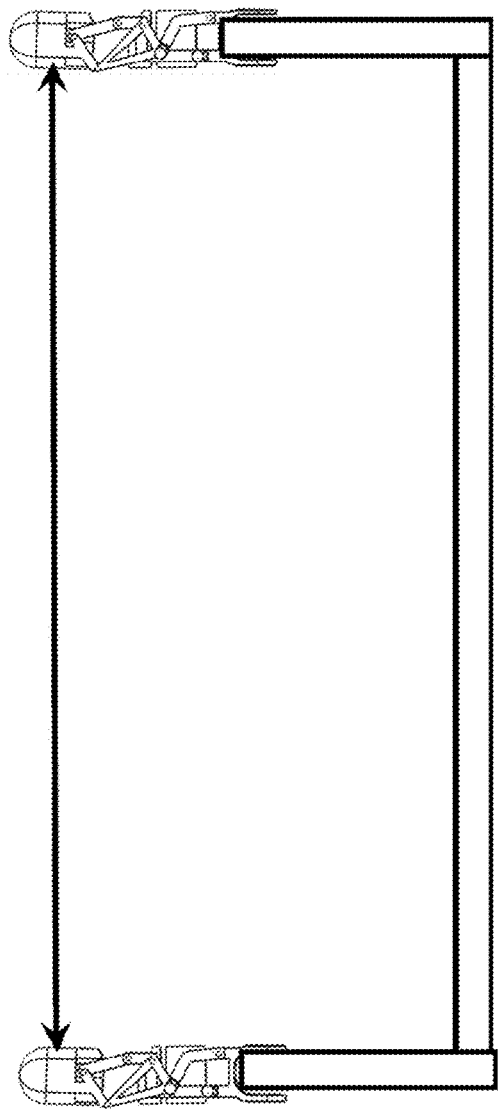
FIG. 9 is a schematic view of a distance measuring system in a second application scenario according to an embodiment of the present disclosure.

The control process is described hereinafter with an example in which the adjustment-control circuit is disposed at the second distance measuring device. As described above, when the first distance measuring device includes a first driving mechanism and a second driving mechanism while the second distance measuring device includes a third driving mechanism and a fourth driving mechanism, the four driving mechanisms may adopt the same motor. The adjustment-control circuit of the second distance measuring device can make a difference between the second attitude angle measured by the second gyroscope and the first attitude angle transmitted from the first gyroscope. When the difference is not zero, i.e., the first communication component is not parallel to the second communication component, the adjustment-control circuit sends a control signal to the first driving mechanism and the second driving mechanism for controlling at least one of the first interphalangeal joint and the second interphalangeal joint to rotate, and sends a control signal to the third driving mechanism and the fourth driving mechanism for controlling at least one of the third interphalangeal joint and the fourth interphalangeal joint to rotate, until the difference between the first attitude angle and the second attitude angle is zero. When the difference between the first attitude angle and the second attitude angle is zero, it means that the first communication component is parallel to the second communication component. Then, the adjustment-control circuit no longer sends the control signals for continuing rotation, and ensures that the second communication component can receive the ranging signal. The above functions of the adjustment-control circuit may be realized by a single chip computer. FIG. 8 shows using the distance measuring system to measure a distance in a first application scenario, and FIG. 9 shows using the distance measuring system to measure a distance in a second application scenario.

The first distance measuring device may be communicated with the second distance measuring device through 2.4 Ghz or in a Bluetooth mode. When the first distance measuring device is communicating with the second distance measuring device through 2.4 Ghz, the transmission mode may be adopted. At this point, the first distance measuring device sends only the first attitude angle measured by the first gyroscope, and the second distance measuring device just receives the first attitude angle sent from the first distance measuring device. When the first distance measuring device is parallel to the second distance measuring device, the adjustment-control circuit of the second distance measuring device sends a control signal for stopping rotation to the first distance measuring device.

When the first distance measuring device is communicating with the second distance measuring device in a Bluetooth mode, the first distance measuring device and the second distance measuring device are needed to be paired. For example, a universally unique identifier (UUID) of the first distance measuring device may be written into the second distance measuring device, and the first distance measuring device and the second distance measuring device may be paired when they are turned on. At this point, data to be transmitted may be the first attitude angle measured by the first gyroscope. When the first distance measuring device is parallel to the second distance measuring device, the adjustment-control circuit of the second distance measuring device sends a control signal for stopping rotation to the first distance measuring device, thereby stopping rotation.

In actual application, referring to FIG. 3 and FIG. 6, the above distance measuring system may further include a prompter 33 coupled with the adjustment-control circuit. The adjustment-control circuit is further configured to send a measurement signal to the prompter 33 when the first attitude angle and the second attitude angle satisfy a preset condition and the second communication component receives the ranging signal, i.e., when the first interphalangeal joint, the second interphalangeal joint, the third interphalangeal joint and the fourth interphalangeal joint are rotated to proper positions. The prompter 33 is configured to send a measurement prompt according to the measurement signal sent from the adjustment-control circuit. Specifically, the preset condition may include that the difference between the first attitude angle and the second attitude angle is zero. The prompter 33 may be an indicator lamp such as an LED indicator lamp disposed at the first distance measuring device or the second distance measuring device. For example, a green light may light up when receiving the measurement signal sent from the adjustment-control circuit, and a red light may light up when not receiving the measurement signal sent from the adjustment-control circuit.

In actual application, referring to FIG. 6, the above distance measuring system may further include a battery such as a lithium battery 62 that supplies power to the entire distance measuring system. The single chip computer of the calculation circuit or the adjustment-control circuit may be connected with the lithium battery 62 through wires. The single chip computer of the calculation circuit or the adjustment-control circuit may be connected with the display screen, the LED indicator lamp and the infrared transceiver 61 through wires. The single chip computer controls the various devices by providing different signals to pins.

Each distance measuring device of the distance measuring system may refer to the above description and will not be elaborated herein.

Another embodiment of the present disclosure further provides a distance measuring method which may be applied to the above distance measuring system. The distance measuring method includes the following steps S1-S3.

At the step S1, the first distance measuring device sends a ranging signal to the second distance measuring device.

Specifically, this step may be implemented by the first communication component of the first distance measuring device.

At the step S2, the second distance measuring device receives the ranging signal sent from the first distance measuring device.

Specifically, this step may be implemented by the second communication component of the second distance measuring device.

At the step S3, the calculation circuit determines a distance between the first distance measuring device and the second distance measuring device according to the ranging signal.

Specifically, this step may be implemented by the calculation circuit of the distance measuring system.

When the first communication component is disposed at the second interphalangeal joint, the second communication component is disposed at the fourth interphalangeal joint, the first gyroscope is disposed at the second interphalangeal joint and the second gyroscope is disposed at the fourth interphalangeal joint, and the distance measuring system includes the adjustment-control circuit, before the above step S2, the distance measuring method includes the following steps S11-S15.

At the step S11, the first gyroscope obtains a first attitude angle of the first communication component.

Specifically, this step may be implemented by the first gyroscope of the first communication component.

At the step S12, the second gyroscope obtains a second attitude angle of the second communication component.

Specifically, the second attitude angle may be obtained by the second gyroscope of the second distance measuring device.

At the step S13, the first communication component sends the first attitude angle to the adjustment-control circuit.

Specifically, this step may be implemented by the first communication component of the first distance measuring device.

At the step S14, the second communication component sends the second attitude angle to the adjustment-control circuit.

Specifically, this step may be implemented by the second communication component of the second distance measuring device.

At the step S15, based on the first attitude angle and the second attitude angle, the adjustment-control circuit controls at least one of the first interphalangeal joint and the second interphalangeal joint as well as at least one of the third interphalangeal joint and the fourth interphalangeal joint to rotate, thereby enabling the second communication component to receive the ranging signal.

Specifically, this step may be implemented by the adjustment-control circuit of the distance measuring system.

In actual application, when the distance measuring system is turned on, the two distance measuring devices may be first paired and then enter the standby state. A measurement unit and a measurement mode are selected. If selecting a manual mode, the motors of the four driving mechanisms of the two distance measuring devices should be powered off. After manually placing the two distance measuring devices in place, measurement may be started. If selecting an automatic mode, it is needed to first place the metacarpophalangeal joints of the two distance measuring devices in proper positions, respectively. Then, based on data from the first gyroscope and the second gyroscope, the adjustment-control circuit sends controls signals to the four driving mechanisms to fine-tune angles of the first communication component and the second communication component. Measurement may be started when reaching a set standard (i.e., the first communication component is parallel to the second communication component, and the second communication component can receive the ranging signal). Data read may be prompted by voice or a LCD screen.

According to the distance measuring device, the distance measuring system and the distance measuring method provided in the embodiments of the present disclosure, the distance measuring device includes the finger sleeve assembly and the communication component; the finger sleeve assembly includes the first interphalangeal joint and the second interphalangeal joint that is rotatable connected to the first interphalangeal joint; the communication component is disposed on the finger sleeve assembly and is configured to transmit and/or receive ranging signals. With the distance measuring device of one embodiment of the present disclosure, it is easy to measure distances with fingers. The rotary connection between the first interphalangeal joint and the second interphalangeal joint improves flexibility of the distance measuring device as well as the user's comfort when the user wears the distance measuring device.

The various embodiments in the present disclosure are described in a progressive manner, and each embodiment focuses on differences from other embodiments, and the same similar parts between the various embodiments may be referred to each other.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the above description of the present disclosure, reference to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A distance measuring device comprising:
   a finger sleeve assembly; and
   a communication component;
   wherein the finger sleeve assembly includes a first interphalangeal joint and a second interphalangeal joint that is rotatable connected to the first interphalangeal joint;
   wherein the distance measuring device further comprises a monitor disposed at the second interphalangeal joint, and
   the communication component is disposed at the finger sleeve assembly and is configured to at least one of transmit and receive a ranging signal.

2. The distance measuring device of claim 1, wherein the distance measuring device further includes a calculation circuit configured to determine a distance to be measured according to the ranging signal.

3. The distance measuring device of claim 1, wherein the communication component is disposed at the second interphalangeal joint; and the distance measuring device further includes a gyroscope and an adjustment-control circuit;
   the gyroscope is disposed at the second interphalangeal joint and is configured to obtain a first attitude angle of the communication component;
   the communication component is further configured to at least one of send the first attitude angle to an opposite communication component and receive a second attitude angle transmitted by the opposite communication component; and
   the adjustment-control circuit is configured to control rotation of at least one of the first interphalangeal joint and the second interphalangeal joint according to at least one of the first attitude angle and the received second attitude angle, thereby adjusting and controlling an angle at which the communication component at least one of transmits and receives the ranging signal.

4. The distance measuring device of claim 3, wherein the finger sleeve assembly further includes a metacarpophalangeal joint; the metacarpophalangeal joint is configured to fix the distance measuring device; the metacarpophalangeal joint is rotatable connected to the first interphalangeal joint; and the first interphalangeal joint is pivotally connected between the metacarpophalangeal joint and the second interphalangeal joint.

5. The distance measuring device of claim 4, wherein the finger sleeve assembly further includes:
   a first driving mechanism disposed between the metacarpophalangeal joint and the first interphalangeal joint, and configured to drive the first interphalangeal joint to rotate with respect to the metacarpophalangeal joint according to the control signal sent from the adjustment-control circuit; and
   a second driving mechanism disposed between the first interphalangeal joint and the second interphalangeal joint and configured to drive the second interphalangeal joint to rotate with respect to the first interphalangeal joint according to the control signal sent from the adjustment-control circuit.

6. The distance measuring device of claim 5, wherein the first interphalangeal joint is provided with a first bracket; the first driving mechanism includes a first motor and a first reducer mounted to the first motor; and the first motor and the first reducer are fixed to the metacarpophalangeal joint; and
   wherein the first reducer is provided with a first keyway; the first keyway engages with the first bracket; and the first motor is configured to drive the first bracket to rotate.

7. The distance measuring device of claim 5, wherein the first interphalangeal joint is provided with a second bracket, and the second interphalangeal joint is provided with a third bracket; the second driving mechanism includes a second motor and a second reducer mounted to the second motor; the second motor and the second reducer are fixed to the second bracket; and
   wherein the second reducer is provided with a second keyway; the second keyway engages with the third bracket; and the second motor is configured to drive the third bracket to rotate.

8. The distance measuring device of claim 1, wherein the communication component includes an infrared transceiver.

9. The distance measuring device of claim 1, further comprising a prompter disposed at the second interphalangeal joint.

10. The distance measuring device of claim 9, wherein the prompter includes an indicator lamp.

11. A distance measuring device comprising:
    a finger sleeve assembly; and
    a communication component;
    wherein the finger sleeve assembly includes a first interphalangeal joint and a second interphalangeal joint that is rotatable connected to the first interphalangeal joint,
    wherein the distance measuring device further comprises a battery in the second interphalangeal joint, and the communication component is disposed at the finger sleeve assembly and is configured to at least one of transmit and receive a ranging signal.

12. A distance measuring system comprising:
a first distance measuring device;
a second measuring device; and
a calculation circuit;
wherein the first distance measuring device includes a first finger sleeve assembly and a first communication component; the first finger sleeve assembly includes a first interphalangeal joint and a second interphalangeal joint that is rotatable connected to the first interphalangeal joint; the first communication component is disposed at the first finger sleeve assembly and is configured to transmit a ranging signal;
the second distance measuring device includes a second finger sleeve assembly and a second communication component; the second finger sleeve assembly includes a third interphalangeal joint and a fourth interphalangeal joint that is rotatable connected to the third interphalangeal joint; the second communication component is disposed at the second finger sleeve assembly and is configured to receive the ranging signal; and
the calculation circuit is configured to, according to the ranging signal, determine a distance between the first distance measuring device and the second distance measuring device.

13. The distance measuring system of claim 12, wherein the distance measuring system further includes a monitor; the monitor is coupled with the calculation circuit and is configured to display the distance between the first distance measuring device and the second distance measuring device.

14. The distance measuring system of claim 13, wherein the distance measuring system further includes a unit conversion circuit; the unit conversion circuit is coupled with the calculation circuit and the monitor; and the unit conversion circuit is configured to convert the unit of the distance between the first distance measuring device and the second distance measuring device, and send a distance of a converted unit to the monitor to be displayed.

15. The distance measuring system of claim 12, wherein the first communication component is disposed at the second interphalangeal joint, the second communication component is disposed at the fourth interphalangeal joint, a first gyroscope is disposed at the second interphalangeal joint and a second gyroscope is disposed at the fourth interphalangeal joint; the distance measuring system further includes an adjustment-control circuit;
the first gyroscope is configured to obtain a first attitude angle of the first communication component;
the second gyroscope is configured to obtain a second attitude angle of the second communication component;
the first communication component is further configured to transmit the first attitude angle to the adjustment-control circuit;
the second communication component is further configured to transmit the second attitude angle to the adjustment-control circuit;
the adjustment-control circuit is configured to, according to the first attitude angle and the second attitude angle, control at least one of the first interphalangeal joint and the second interphalangeal joint as well as at least one of the third interphalangeal joint and the fourth interphalangeal joint to rotate, thereby enabling the second communication component to receive the ranging signal.

16. The distance measuring system of claim 15, wherein the adjustment-control circuit is configured to, according to a difference between the first attitude angle and the second attitude angle, control at least one of the first interphalangeal joint and the second interphalangeal joint as well as at least one of the third interphalangeal joint and the fourth interphalangeal joint to rotate, thereby enabling the second communication component to receive the ranging signal.

17. The distance measuring system of claim 15, wherein the distance measuring system further includes a prompter coupled with the adjustment-control circuit;
the adjustment-control circuit is further configured to send a measurement signal to the prompter when the first attitude angle and the second attitude angle satisfy a preset condition and the second communication component receives the ranging signal; and
the prompter is configured to send a measurement prompt according to the measurement signal sent from the adjustment-control circuit.

18. A distance measuring method applied to the distance measuring system of claim 13, comprising:
sending, by the first distance measuring device, a ranging signal;
receiving, by the second distance measuring device, the ranging signal sent from the first distance measuring device; and
determining, by the calculation circuit, a distance between the first distance measuring device and the second distance measuring device according to the ranging signal.

19. The distance measuring method of claim 18, wherein the first communication component is disposed at the second interphalangeal joint, the second communication component is disposed at the fourth interphalangeal joint, a first gyroscope is disposed at the second interphalangeal joint and a second gyroscope is disposed at the fourth interphalangeal joint, and the distance measuring system further includes an adjustment-control circuit;
before receiving, by the second distance measuring device, the ranging signal sent from the first distance measuring device, the distance measuring method further includes:
obtaining, by the first gyroscope, a first attitude angle of the first communication component;
obtaining, by the second gyroscope, a second attitude angle of the second communication component;
sending, by the first communication component, the first attitude angle to the adjustment-control circuit;
sending, by the second communication component, the second attitude angle to the adjustment-control circuit; and
based on the first attitude angle and the second attitude angle, controlling, by the adjustment-control circuit, at least one of the first interphalangeal joint and the second interphalangeal joint as well as at least one of the third interphalangeal joint and the fourth interphalangeal joint to rotate, thereby enabling the second communication component to receive the ranging signal.

* * * * *